April 3, 1945.  E. S. KNOCHEL ET AL  2,372,962

CABLE CLAMP

Filed July 26, 1943

*INVENTOR.*
EDWARD S. KNOCHEL
JAMES J. PASELA
BY *George Douglas Jones*
ATTORNEY Patented Apr. 3, 1945

2,372,962

UNITED STATES PATENT OFFICE 2,372,962

CABLE CLAMP

Edward S. Knochel and James J. Pasela, Baltimore, Md., assignors to The Glenn L. Martin Company, Middle River, Md., a corporation of Maryland Application July 26, 1943, Serial No. 496,222

4 Claims. (Cl. 24—136)

This invention relates to an improved clamping device for use in a cable testing machine.

It is very difficult to get a true test of the tensile strength of small cables due to the fact that any of the known clamping devices to secure the cable in the testing machine either cause a fracture of the cable at the clamp or materially alter the cross-section area and failure occurs where it is not intended.

An object of this invention is to provide a clamping device for small cables for a testing machine.

Another object is to provide a clamping device that will not fracture or alter the cross-sectional area of the cable under test.

Another object is to provide a clamping device that will accommodate several sizes of cables.

A further object of this invention is to provide a clamp into which the cable may be quickly and readily inserted.

Further and other objects will become apparent from the description of the accompanying drawing which forms a part of this disclosure and in which like numerals refer to like parts.

Figure 2:
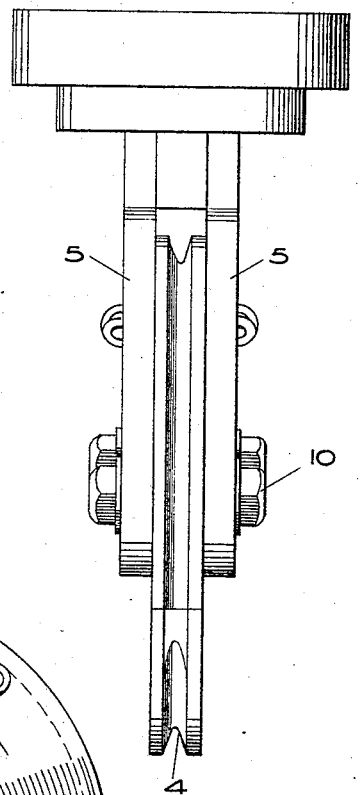
Figure 2 is an elevational view of the clamp.

The clamp illustrated in the drawing is one of a pair used in a testing machine. Block 1 will be secured to the fixed table of a tension testing machine and the same part of a similar clamp will be secured to the movable head of a tension testing machine. Bracket 2 supports sheave 3 so that groove 4 on one side of the sheave is substantially in line with the axis of the support 1. The sheave is pivoted between members 5 of bracket 2, on bolt 10 and has a V-shaped groove 4, rounded on the bottom, to accommodate a range of diameters of the cable to be tested in the same sheave. The sheave has a notch or eccentric slot 6 extending from the periphery inwardly toward the center of the sheave. Slot 7 is formed in the side of the notch in the sheave and is of sufficient width to accommodate a pin 8. The slots in members 5, indicated as 9, intersect the notch 6 of the sheave approximately at the end of slot 7.

Figure 1:
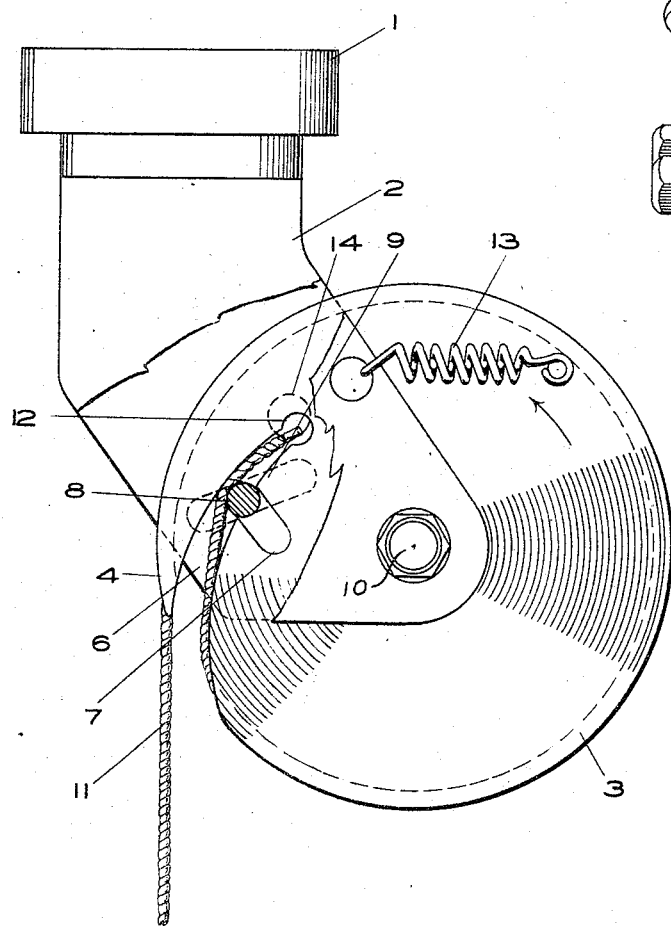
Figure 1 shows the clamping device partly in section.

Spring 13 restrains the sheave from rotation in a clockwise direction as shown in Figure 1 and also places a slight tension on the sheave to facilitate loading.

Holes 14 are formed in members 5 and serve as peep-holes so that one can see when the tip of the cable to be clamped is in portion 12 of the slot 6.

In use, two such clamps are installed in the testing machine and a cable 11 is placed around the sheave in the groove. The end of the cable is passed through the cut-out portion and over pin 8 to opening 12 at the end of notch 6. When a pull is exerted on the cable, pin 8 is moved outwardly by the wedge action of the two slots 7 and 9, and presses the cable against the outer edge of the notch in the sheave. The friction of the cable in the V-shaped groove exerts such a force on the cable that the tension adjacent the pin 8 needed to restrain the cable is so small that not much clamping action by the pin is required to hold the cable during a tensile testing. Due to the small force involved, the cable is not damaged by the clamp.

While the description of the invention is primarily related to the use of the device in a cable testing machine, it is obvious that the invention can be used wherever it is desired to secure or clamp the end of a cable which will be placed under tension.

It is to be understood that certain changes, alterations, modifications and substitutions can be made without departing from the spirit and scope of the appended claims.

We claim as our invention:

1. A cable clamping device comprising a bracket, a sheave pivotally supported on portions of said bracket extending on each side of said sheave, said sheave having an eccentric curved slot extending inwardly from the periphery thereof, into which slot a cable to be clamped is placed after it has been wrapped around the periphery of the sheave, said bracket portions supporting the sheave having cam slots formed therein, said cam slots positioned to extend at an angle to said eccentric slot, a pin adapted to be placed through the aperture formed by the intersection of said cam slots and said eccentric slot, whereby upon relative motion of the sheave and bracket said pin is moved to clamp the cable against the side of said eccentric slot.

2. A cable clamping device comprising a bracket, a sheave pivotally supported on portions of said bracket extending on each side of said sheave, said sheave having a V-shaped groove in the edge thereof, and having an eccentric slot extending inwardly from the periphery thereof, into which slot the cable to be clamped is placed after it has been wrapped around the sheave, said bracket portions supporting the sheave having cam slots formed therein, said cam slots positioned to extend at an angle to said eccentric slot, a pin adapted to be placed through the aperture formed by the intersection of said cam slots and said eccentric slot, whereby upon relative motion of the sheave and bracket, due to tension on the cable, said pin is moved to clamp the cable against the side of said eccentric slot.

3. A cable clamping device comprising a bracket, a sheave pivotally supported on portions of said bracket extending on each side of said sheave, angularly positioned slots in said sheave and said supporting bracket portions, said slot in said sheave extending inwardly from the periphery thereof into which slot a cable to be clamped is placed after it has been wrapped around the sheave, pin means extending through the aperture formed by the intersection of said slots, whereby upon relative motion of the sheaves and supporting bracket portions due to tension on the cable, said pin is moved to clamp the cable against the side of the slot in the sheave.

4. A cable clamping device comprising a sheave pivotally supported on a bracket extending on each side thereof, said sheave having a notch into which the end of the cable may be placed after it has been wrapped around the periphery of the sheave, locking means actuated by relative motion between said bracket and said sheave to hold the end of the cable in said notch, said locking means comprising a slot in said sheave that terminates at said notch, and slots in the adjacent portions of the supporting brackets that extend across the intersection of said first mentioned slot and notch, a pin extending through the slots in said sheave and said bracket, that is moved by the relative motion between said sheave and said bracket to clamp the cable against the side of said notch.

EDWARD S. KNOCHEL.
JAMES J. PASELA.